United States Patent Office 3,011,982
Patented Dec. 5, 1961

3,011,982
REFRACTORY AND METHOD OF MAKING THE SAME
Eugene A. Maduk and Richard W. Ricker, New Kensington, Pa., assignors to Aluminum Company of America, Pittsburgh, Pa., a corporation of Pennsylvania
No Drawing. Filed Feb. 4, 1959, Ser. No. 791,042
10 Claims. (Cl. 252—520)

This invention relates to a composition of matter and method of making the same. More particularly it relates to a refractory composition composed essentially of a high melting point titanium containing compound bonded by aluminum nitride which displays high electrical conductivity coupled with mechanical strength, high thermal stability and resistance to chemical attack.

In the electrolytic production of aluminum by the Hall process, it has been the usual practice to employ a carbonaceous lining of the reduction cell as the cathode. It is of primary importance that the electrodes used in the electrolytic cell have a high electrical conductivity in order to minimize power losses. However, the conventional carbon lining is subject to attack by the molten cryolite bath and the molten aluminum metal in the reduction pot causing a weight loss, volume increase, and breaks or cracks in the lining. This deterioration decreases the power efficiency of the cell.

Consequently, it is a primary object of this invention to provide a refractory composition that displays excellent resistance to attack by molten cryolite and molten aluminum, and practical methods for making the same.

It is another object of this invention to provide a refractory composition exhibiting a low electrical resistivity which is suitable for use as an electrode in an electrolytic cell for the production of aluminum.

It is still another object to provide a refractory composition that will permit normal handling and use without cracking, chipping or breaking.

These and other objects and advantages of the present invention will become evident from the following description and claims.

In accordance with the present invention, a refractory composition is produced which consists essentially of titanium cyanonitride and aluminum nitride, generally in the proportion of 35 to 50% by weight of the cyanonitride and 50 to 65% by weight of the aluminum nitride. This composition has a low electrical resistivity on the order of from 250 to $5000 \times 10^{-6}$ ohm inches. At room temperature, the refractory has a modulus of rupture of from 7500 to 10,000 pounds per square inch. Chemically, it is substantially inert to molten cryolite and liquid aluminum.

The titanium cyanonitride component consists essentially of a solid solution of TiN and TiC, as determined by X-ray diffraction analysis. The proportion of TiN to TiC determined by real density measurements is approximately three to one. The chemical formula usually ascribed to the cyanonitride is TiCN, but this is not accurate since it is not a definite chemical compound.

Although the refractory can be made by mixing finely divided particles of titanium cyanonitride and aluminum nitride with a suitable green or temporary binder and subsequently firing the mass, a better and cheaper method consists of preparing a mixture of the cyanonitride particles and aluminum powder with an organic binder, molding the mixture into the desired shape and firing in a nitrogen-containing atmosphere whereby substantially all of the aluminum is converted into aluminum nitride, and the organic binder is destroyed. In both instances, the aluminum nitride serves as a binding medium between the titanium cyanonitride particles.

The titanium cyanonitride employed in the present invention may contain impurities such as metallic zirconium, vanadium, iron and silicon, or oxides, carbides or nitrides of these elements as well as metallic titanium or oxides of titanium. It is preferable, however, that there be no free metallic elements in the mixture, other than aluminum, before firing, thus avoiding any undesirable oxidation and nitriding. The total impurities in the fired product in any case, should not exceed 10%. Within this range, they do not substantially affect the electrical resistivity and strength of the refractory.

According to the preferred practice, the refractory composition is made from a mixture of 45 to 55% by weight of titanium cyanonitride of a minus 100 mesh particle size, and preferably a minus 325 mesh particle size, and 40 to 50% by weight of finely divided aluminum, preferably atomized aluminum powder of at least 99% pure, of at least a minus 100 mesh particle size. The foregoing proportions have been found to be essential in making a fired product that will satisfactorily withstand attack by molten cryolite or molten aluminum metal. These components must be molded into the desired shape before the aluminum is converted into the nitride, and to supply the necessary adhesive, an organic binder is added to the mixture. For this purpose from 4 to 8% by weight of an organic binder such as is used in the sand core art is added and the mixture is blended in a mixer until it is uniform. Numerous binders are in fluid or liquid condition only at elevated temperatures as in the case of a thermoplastic binder. It therefore may be necessary to mix the batch at a temperature sufficient to retain the binder in a fluid condition. The choice of binder material is critical only insofar that it should possess satisfactory adhesive qualities, that it should not react with either of the raw materials, and that it should decompose or burn-off during the nitriding operation leaving no objectionable compounds or impurities in the refractory. The binder may be, for example, a coal tar pitch, such as 40° coal tar pitch, or a lignin derivative such as ligno polysulfonate, or a high molecular weight wax. A smaller quantity of binder than mentioned will not supply sufficient strength to the mixture to permit fabricating it into the desired shape or body. On the other hand, any binder in excess of 8% is undesirable from the standpoint of causing excessive porosity in the fired composition.

The mixture can be pressed to form a desired shape by any of the well-known pressure molding methods immediately upon removal from the mixer, or the material can be stored to be pressed at a later period. The pressure used in fabricating the shape generally should not be less than 4000 pounds per square inch. Lower pressures produce a low density body which in turn yields a highly porous fired product which is undesirable for withstanding attack by molten cryolite or molten aluminum.

According to one method the desired shape is fired in a non-oxidizing atmosphere containing a substantial amount of nitrogen, preferably at least 90% nitrogen, and is brought to the desired temperature by heating at a rate of approximately 45 to 60° C. per hour from room temperature to the soaking temperature. This temperature should be approximately 1300° C., but it is neither necessary nor desirable to exceed 1800° C. The molded body is soaked within that temperature range from about one to twenty hours, and in any event for a sufficient length of time to convert substantially all of the aluminum to aluminum nitride. Firing in a non-oxidizing atmosphere containing at least 90% nitrogen, and soaking at a minimum temperature of 1300° C. are preferred for carrying out the reaction within a reasonable period of time. A higher firing or soaking temperature may increase slightly the density or electrical conductivity of the final product, but this increase generally is not sufficient to warrant the higher temperatures. The length of the soaking period depends on the particular size and shape of the material being fired. Under the foregoing heating and soaking conditions, the titanium cyanonitride undergoes no change, and it is only the aluminum and organic binder which are affected. After the aluminum nitride has been formed, the body is allowed to cool in the nitrogen atmosphere to approximately 300° C. before removal from the heating chamber.

An alternative method called flash firing yields a final product of lower electrical resistivity. The fabricated shape is initially fired in an air atmosphere in a furnace maintained at a temperature of approximately 1000° C. At this temperature, the oxygen of the air reacts exothermally with the aluminum on the external surface of the molded body. The aluminum oxide thus formed provides a protective layer which prevents oxidation of the balance of the aluminum in the interior of the body. However, it should be understood that small amounts of the aluminum in the interior of the body may react with air entrapped in the sample, or the aluminum may react with the impurities contained in the body. This has substantially no effect upon the final product. After the exothermic reaction is complete, the body is allowed to cool, and the oxide layer on the surface is mechanically removed as by sand blasting. The shape is then slow fired in a nitrogen containing atmosphere essentially as outlined above. The characteristics and properties of this fired product are substantially identical with those of the refractory described above except that it has an electrical resistivity in the range of from 250 to $1000 \times 10^{-6}$ ohm inches, whereas the refractory obtained without the flash firing step has a range of from 1000 to $5000 \times 10^{-6}$ ohm inches.

In the preferred embodiment of our invention, we use oil pumped nitrogen as the non-oxidizing atmosphere. The final product exhibits a high electrical resistivity if the material is fired in the last stage in an atmosphere containing detectable amounts of oxygen or moisture. Therefore, as a precautionary step in insuring the removal of substantially all the oxygen and moisture from the oil pumped nitrogen, it should be purified by passing it through a purification train. In such a train, the nitrogen is first dehydrated, preferably by bubbling it through a concentrated solution of sulfuric acid, and then passing it through a column of magnesium perchlorate. The oxygen is then removed by passing the dehydrated gas through a column of steel wool or copper filings heated to approximately 800° C., and again dehydrated by passing through a column of magnesium perchlorate. A continuous flow of nitrogen may be maintained in this manner throughout the firing operation. The steel wool or copper may be regenerated with hydrogen before each run. Satisfactory results may also be obtained by heating the pressed shapes in a purified atmosphere of approximately 93% nitrogen and 7% hydrogen, or in an atmosphere of cracked ammonia.

The refractory made according to our invention may be used as the cathode lining in an aluminum reduction cell because of its superior strength and resistance to penetration by molten cryolite and molten aluminum as compared to the conventional carbon lining. The lining of the electrolytic cell may be constructed from bricks or thin slabs which have been preformed and fired as described above. The bricks or slabs can be joined to each other with any suitable commercial cement which is resistant to both the molten cryolite and molten aluminum. Electrical contact can be made in any known manner.

The fired refractory composition may also be employed as a crucible holder in the well-known sulfate test. This test involves determining the reactivity of carbon with oxygen by adding carbon to fused sodium sulfate. The new refractory will satisfactorily withstand the corrosive fumes of the sodium sulfate at 960° C.

The invention is illustrated by one specific example of the method of producing the refractory wherein a 3500 gram refractory batch was prepared by mixing 1750 grams of titanium cyanonitride of a minus 325 mesh size with 1575 grams of atomized aluminum powder in a Baker-Perkins mixer at 80° C. for one hour. 175 grams of 40° coal tar pitch, preheated to approximately 70° C. was added to the dry powder mass and mixed therewith for an additional ninety minutes. The hot mass was then cold pressed in a steel die at 7000 pounds per square inch into the form of a rod one inch in diameter and three inches in length. The resulting shape was placed in a closed furnace chamber which was partially evacuated prior to the introduction of oil pumped nitrogen which has been passed through a purification train. The flow of nitrogen was maintained as the molded rod was heated at a rate of approximately 45° C. per hour from room temperature to 1500° C. and held at that temperature for five hours after which both the molded shape and furnace were allowed to cool to approximately 300° C. After removal from the furnace chamber the rod was examined and no evidence of cracking was observed. The refractory body had an approximate bulk density of 2.6 grams per cubic centimeter, and it was found to have an electrical resistivity of about $1000 \times 10^{-6}$ ohm inches. In a mechanical property test it was determined that the rod had a modulus of rupture of approximately 8650 pounds per square inch.

To ascertain the resistance to attack by molten cryolite and molten aluminum, samples of the refractory composition and of the conventional carbon pot lining were submerged in a typical reduction pot bath of molten cryolite containing aluminum oxide at 980° C. for two hours, and the samples were connected to a source of D.C. power so that they operated as cathodes in the same manner as a pot lining. An average current density of 5.0 amperes per square inch was maintained on the carbon sample while the refractory was exposed to a current density of 6.4 amperes per square inch. At the end of two hours, the refractory exhibited essentially no change in volume, a weight increase of 5.5%, and there was no evidence of attack by the bath nor by the molten aluminum formed during the reduction process. The carbon lining underwent a volume increase of 3%, a weight loss of 42.1% and was extensively attacked by the cryolite and molten aluminum.

It is to be understood that the composition and process of making it herein described may be varied without departing from the invention, and that the use of the products is not limited to any specific field or fields of application.

Having described the present invention, we claim:

1. A refractory composition consisting essentially of 35 to 50% by weight titanium cyanonitride and 50 to 65% by weight aluminum nitride characterized by a low electrical resistivity of from approximately 250 to $5000 \times 10^{-6}$ ohm inches, and by substantially chemical inertness to molten cryolite and molten aluminum metal.

2. A refractory composition consisting essentially of 35 to 50% by weight titanium cyanonitride, 50 to 65% by weight aluminum nitride and not over 10% by weight of oxide impurities characterized by a low electrical resistivity of from approximately 250 to $5000 \times 10^{-6}$ ohm inches, and by substantially chemical inertness to molten cryolite and molten aluminum metal.

3. A method of making an article of manufacture comprising mixing 45 to 55% by weight titanium cyanonitride with 40 to 50% by weight aluminum, both of said materials having a particle size of 100 mesh or finer, adding thereto from 4 to 8% by weight of a temporary organic binder to provide sufficient adhesive strength, compressing the mass to form a shaped body, heating said body in a chamber containing a non-oxidizing atmosphere containing at least 90% nitrogen from substantially room temperature to a soaking temperature of about 1300° C., soaking said body at said temperature for a sufficient period to convert substantially all of the aluminum into aluminum nitride, cooling said body after the aluminum nitride has been formed, maintaining the gas flow until said body has cooled to approximately 300° C., removing said body from said chamber, and allowing said body to cool to room temperature in the atmosphere.

4. The method according to claim 3 wherein said body is slow fired in said non-oxidizing atmosphere at a rate of approximately 45 to 60° C. per hour.

5. The method according to claim 3 wherein 4 to 8% by weight 40° coal tar pitch is employed as the binder.

6. The method according to claim 3 wherein 4 to 8% by weight ligno polysulfonate is employed as the binder.

7. A method of making an article of manufacture comprising mixing 45 to 55% by weight titanium cyanonitride with 40 to 50% by weight aluminum, both of said materials having a particle size of 100 mesh or finer, adding thereto from 4 to 8% by weight of a temporary organic binder to provide sufficient adhesive strength, compressing the mass to form a shaped body, heating said body in an air atmosphere in a furnace maintained at a temperature of approximately 1000° C. for a sufficient period to allow the oxygen of the air to react with the aluminum on the external surface of said body, permitting said body to cool, mechanically removing said oxide layer thus formed, reheating said body in a chamber containing a non-oxidizing atmosphere containing at least 90% nitrogen from substantially room temperature to a soaking temperature of about 1300° C., soaking said body at said temperature for a sufficient period to convert substantially all of the aluminum into aluminum nitride, cooling said body after the aluminum nitride has formed, maintaining the gas flow until said body has cooled to approximately 300° C., removing said body from said chamber, and allowing said body to cool to room temperature in the atmosphere.

8. The method according to claim 7 wherein said body is slow fired in said non-oxidizing atmosphere at a rate of approximately 45 to 60° C. per hour.

9. The method according to claim 7 wherein 4 to 8% by weight 40° coal tar pitch is employed as the binder.

10. The method according to claim 7 wherein 4 to 8% by weight ligno polysulfonate is employed as the binder.

References Cited in the file of this patent

UNITED STATES PATENTS

| | | |
|---|---|---|
| 2,439,290 | Fetterley | Apr. 6, 1948 |
| 2,480,475 | Johnson | Aug. 30, 1949 |
| 2,839,413 | Taylor | June 17, 1958 |